United States Patent

Cunningham et al.

[11] Patent Number: 5,974,785
[45] Date of Patent: Nov. 2, 1999

[54] CLOSED LOOP BIAS AIR/FUEL RATIO OFFSET TO ENHANCE CATALYTIC CONVERTER EFFICIENCY

[75] Inventors: Ralph Wayne Cunningham, Milan; Paul Chester Gaworecki, Canton; Patrick Joseph Curran, Farmington Hills, all of Mich.

[73] Assignee: Ford Global Technologies, Inc., Dearborn, Mich.

[21] Appl. No.: 08/786,387

[22] Filed: Jan. 16, 1997

[51] Int. Cl.[6] .................................................... F01N 3/00
[52] U.S. Cl. ................................ 60/274; 60/286; 60/285; 60/284
[58] Field of Search .............................. 60/274, 276, 286, 60/300, 303, 285, 284

[56] References Cited

U.S. PATENT DOCUMENTS

| | | |
|---|---|---|
| 4,167,924 | 9/1979 | Carlson et al. . |
| 4,209,981 | 7/1980 | Miyamori et al. . |
| 4,222,236 | 9/1980 | Hegedus et al. . |
| 4,233,811 | 11/1980 | Masaki . |
| 4,271,798 | 6/1981 | Seitz et al. . |
| 4,574,588 | 3/1986 | Hayama et al. . |
| 4,617,794 | 10/1986 | Fujitani et al. . |
| 4,681,077 | 7/1987 | Kobayashi et al. . |
| 4,729,220 | 3/1988 | Terasaka et al. . |
| 5,070,692 | 12/1991 | Nada . |
| 5,077,971 | 1/1992 | Kumagai et al. . |
| 5,207,058 | 5/1993 | Sasaki et al. . |
| 5,211,011 | 5/1993 | Nishikawa et al. . |
| 5,315,823 | 5/1994 | Nishikawa et al. . |
| 5,414,994 | 5/1995 | Cullen et al. ........................... 60/247 |
| 5,462,039 | 10/1995 | Mamiya et al. . |
| 5,501,074 | 3/1996 | Suetsugu et al. . |
| 5,564,404 | 10/1996 | Takahashi et al. . |
| 5,577,383 | 11/1996 | Kuroda et al. . |
| 5,600,948 | 2/1997 | Nakajima et al. . |
| 5,622,049 | 4/1997 | Kitamura et al. . |
| 5,623,824 | 4/1997 | Yukawa et al. . |

FOREIGN PATENT DOCUMENTS

| | | |
|---|---|---|
| 03124909 | 5/1991 | Japan . |
| 05231136 | 9/1993 | Japan . |
| 05231137 | 9/1993 | Japan . |
| 05231138 | 9/1993 | Japan . |
| 05312026 | 11/1993 | Japan . |
| 06093845 | 4/1994 | Japan . |
| 06330741 | 11/1994 | Japan . |
| 07071234 | 3/1995 | Japan . |
| 07293233 | 11/1995 | Japan . |
| 07305644 | 11/1995 | Japan . |
| 07310534 | 11/1995 | Japan . |
| 08004522 | 1/1996 | Japan . |
| 08061052 | 3/1996 | Japan . |
| 08100639 | 4/1996 | Japan . |
| 08105318 | 4/1996 | Japan . |
| 08121147 | 5/1996 | Japan . |

*Primary Examiner*—Thomas E. Denion
*Assistant Examiner*—Binh Tran
*Attorney, Agent, or Firm*—Allan J. Lippa; Roger L. May

[57] ABSTRACT

A method and system for reducing time required for a catalyst to reach optimum operating temperature control an air/fuel ratio based on the catalyst temperature to supply excess air to the catalyst during closed loop lambda control. A lambda bias or offset is varied as a function of the catalyst temperature, engine speed, and engine load to bias the air/fuel ratio lean of the stoichiometric ratio. Excess air may be supplied to the catalyst for a predetermined period after a cold engine start or at any time that the catalyst temperature is below its optimum operating temperature for efficient conversion. The bias or offset is reduced to zero after the catalyst reaches a desired operating temperature or the predetermined time period expires.

13 Claims, 3 Drawing Sheets

CLOSED LOOP BIAS AIR/FUEL RATIO OFFSET TO ENHANCE CATALYTIC CONVERTER EFFICIENCY

TECHNICAL FIELD

The present invention relates to a method and system for altering the air/fuel ratio during closed loop control of an internal combustion engine to increase the conversion efficiency of a catalytic converter.

BACKGROUND ART

To reduce regulated exhaust gas emissions, a catalytic converter is typically installed in the exhaust system of the engine. The effectiveness of the catalyst in transforming the exhaust emissions depends on a number of factors, but is most influenced by the temperature of the catalyst and the mass air flow past the catalyst. Catalytic conversion does not occur until the catalyst reaches a relatively high operating temperature. As the catalyst temperature rises past a threshold temperature, the catalyst begins to promote the reactions which convert the exhaust emissions. The catalyst is most efficient when it is functioning within an operating temperature range based on the particular formulation and design of the catalyst.

When the engine is first started, or any other time the converter temperature falls below its optimum operating temperature, the efficiency of the catalyst is reduced. As such, it is desirable to reduce the amount of time during which the catalyst is outside of its optimum operating temperature range to improve overall conversion efficiency.

Electronic thermactor air (ETA) systems have been used to increase the rate at which the catalyst reaches its operating temperature from a relatively cold ambient temperature. The ETA systems introduce excess air (and therefore oxygen) into the exhaust stream causing the catalyst to reach its operating temperature more quickly. However, these systems require additional hardware, such as pumps and valves, to provide the excess air to the exhaust stream. It is thus desirable to reduce the amount of time the catalyst is below its optimum operating temperature by providing excess air to the catalyst without the cost and complexity associated with the prior art systems and methods.

DISCLOSURE OF THE INVENTION

A general object of the present invention is to provide a method and system for controlling an air fuel ratio to supply excess air to a catalytic converter during closed loop control to decrease the time required for the converter to reach a predetermined operating temperature.

In carrying out the above object and other objects, features and advantages of the present invention, a system for controlling an air/fuel ratio is provided. The system is suited for use with a vehicle having an internal combustion engine which emits exhaust gases and a catalytic converter operatively associated with the engine for converting the exhaust gases. The system includes a fuel supply coupled to the engine for providing fuel to the engine according to a controllable air/fuel ratio. The system further includes a sensor interposed the engine and the converter for providing a feedback signal indicative of the air/fuel ratio. An Engine Control Module (ECM) cooperates with the fuel supply and the sensor. The ECM processes the feedback signal and controls the air/fuel ratio in response to the temperature of the converter by controlling the quantity of fuel supplied to the engine. The ECM controls the air/fuel ratio during closed loop operation to supply excess air to the converter so as to decrease the time required for the converter to reach operating temperature.

In further carrying out the above object and other objects, features and advantages of the present invention, a method is provided for closed loop control of an air/fuel ratio of an internal combustion engine to reduce time required for a catalytic converter to reach a predetermined operating temperature. The method includes determining temperature of the catalytic converter, determining an air/fuel ratio based on oxygen present in exhaust gases entering the catalytic converter, and controlling the air/fuel ratio by modifying quantity of fuel supplied to the engine in response to the temperature of the converter such that excess air is supplied to the converter to decrease time required for the converter to reach the predetermined operating temperature. The method preferably includes controlling the fuel to decrease the excess air as the temperature of the converter increases and terminating control of the air/fuel ratio in response to the temperature of the converter after the temperature reaches a predetermined operating temperature.

A number of advantages are associated with the present invention. For example, the present invention reduces the time required for the converter to reach its operating temperature. Consequently, the overall conversion efficiency of the converter is increased. The present invention may also be implemented with existing hardware and is thus more cost effective than prior art systems and methods.

The above objects and other objects, features, and advantages of the present invention should be readily apparent from the following detailed description of the best mode for carrying out the invention when taken in connection with the accompanying drawings.

BEST MODES FOR CARRYING OUT THE INVENTION

Figure 1:
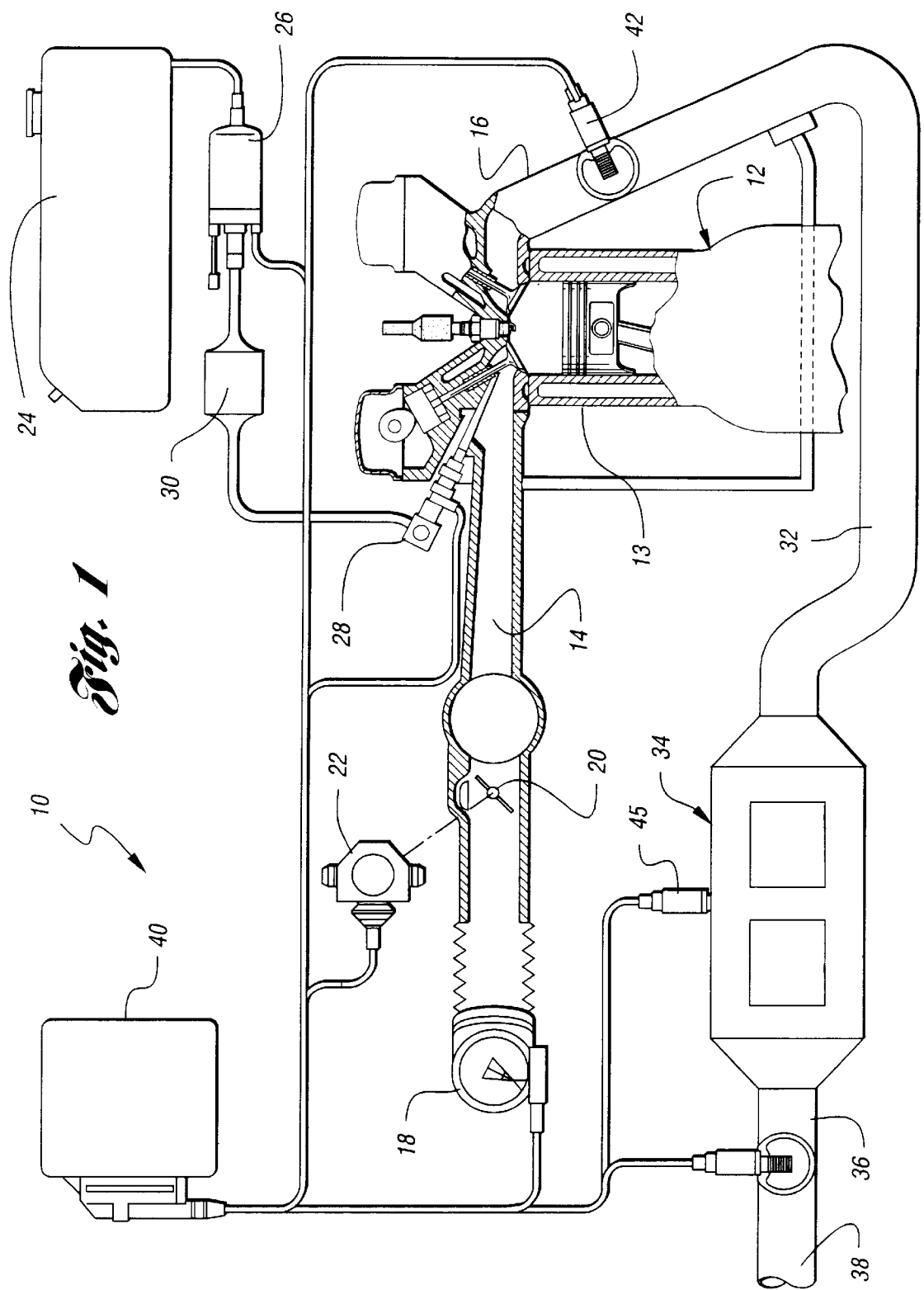
FIG. 1 is a schematic drawing of one embodiment of the present invention.

Turning now to FIG. 1, a schematic drawing of one embodiment of the present invention is shown. System 10 includes an internal combustion engine 12 shown as a cylinder 13 having an intake manifold 14 and an exhaust manifold 16. Air is drawn past an air flow sensor 18 into intake manifold 14. Air flow sensor 18 is preferably a mass air flow sensor which provides an indication of the mass air flow into engine 12. Air flow is regulated by a throttle valve 20 which may be operative with a throttle valve switch 22 controlled in response to position of an accelerator pedal (not specifically shown). Alternatively, a mechanical linkage may be provided to control throttle valve 20. In either case, a sensor, such as throttle valve switch 22, is used to generate a signal indicative of position of throttle valve 20.

Fuel from a fuel tank 24 is pumped by a fuel pump 26 to a fuel injector 28. Preferably, a fuel filter 30 interposed fuel pump 26 and fuel injector 28 is used to remove contaminants from the fuel. Fuel injector 28 injects fuel into intake manifold 14 where it is combined to form an air/fuel mixture.

After ignition, the combusted air/fuel mixture is exhausted from engine 12 into exhaust manifold 16. The exhaust gases flow through an exhaust pipe 32 through a catalytic converter 34, which contains an appropriate catalyst.

Converter 34 promotes reactions to transform the hydrocarbons (HC), carbon monoxide (CO), and oxides of nitrogen ($NO_x$) present in the exhaust into water vapor, carbon dioxide, and nitrogen. The catalyst requires an elevated operating temperature which depends on its formulation and design, preferably in the range between 1000° F. and 1500° F. After passing through catalytic converter 34, the exhaust gases are expelled through a rear exhaust pipe 36, a tailpipe 38, and a muffler (not specifically illustrated).

System 10 also includes an Engine Control Module (ECM) 40 which cooperates with air flow sensor 18 and throttle valve switch 22 to monitor the quantity of air flowing through engine 12. ECM 40 also cooperates with fuel injector 28 to control the quantity and timing of fuel injected into intake manifold 14 of engine 12. By controlling fuel quantity supplied by injectors 28 for a particular sensed mass air flow indicated by sensor 18, ECM 40 controls the air/fuel ratio of the mixture supplied to engine 12. Of course, a number of other factors may be considered by ECM 40 in controlling the air/fuel ratio, such as exhaust gas recirculation (EGR) and residual mass fraction.

A first oxygen sensor 42 is located along exhaust pipe 32 interposed exhaust manifold 16 and the entrance of catalytic converter 34. First oxygen sensor 42 senses the presence or absence of oxygen within exhaust pipe 32 and provides a feedback signal in response thereto which is communicated to ECM 40. First oxygen sensor 42 is preferably a bistable oxygen sensor generally referred to as a Heated Exhaust Gas Oxygen (HEGO) sensor, although a proportional sensor may also be used.

Engine 12 may be operated under closed loop or open loop control depending upon the particular operating conditions. To minimize emissions of regulated gases, engine 12 operates in closed loop lambda mode. During closed loop control, ECM 40 controls the fuel via injectors 28 in response to the feedback signal provided by first oxygen sensor 42 to continuously adjust the air/fuel mixture in an attempt to maintain a stoichiometric ratio. As such, if first oxygen sensor 42 generates a signal indicating minimal oxygen in the exhaust gas, ECM 40 adjusts the air/fuel mixture provided to engine 12 toward lean. Conversely, if the oxygen content signal indicates there is excessive oxygen in the exhaust gas, ECM 40 adjusts the air/fuel mixture provided to engine 12 toward rich. Preferably, the air/fuel ratio is adjusted by varying the quantity of fuel supplied by injectors 28.

Various conditions may require engine 12 to be operated under open loop control where the feedback signal provided by first oxygen sensor 42 is not used to maintain a stoichiometric ratio. For example, when maximum power is desired, a rich mixture is supplied. Similarly, when maximum fuel economy is desired, a lean mixture is supplied. Open loop control may also be required after a cold start because first oxygen sensor 42 does not provide an accurate indication of oxygen content until it reaches an appropriate operating temperature.

Preferably, ECM 40 receives signals based on a plurality of engine operating parameters to infer the temperature of the catalyst in catalytic converter 34. One method for inferring the catalyst temperature is described in U.S. Pat. No. 5,414,994, the disclosure of which is hereby incorporated by reference in its entirety. In an alternative embodiment, system 10 includes a temperature sensor 45 cooperating with converter 34 and in communication with ECM 40 to provide an indication of the catalyst temperature.

As previously described, converter 34 has a higher conversion efficiency when operating at a sufficiently high temperature. For example, when the catalyst of converter 34 reaches a desired operating temperature, such as 1000° F., its efficiency approaches 100%. When converter 34 operates at a temperature below the desired operating temperature, the conversion efficiency is reduced. For example, when converter 34 is operating at a temperature of about 600° F., its conversion efficiency is only around 50%.

To improve the overall conversion efficiency of converter 34, system 10 directs excess air to converter 34 by controlling the air/fuel ratio when the catalyst is below its optimum operating temperature range. This reduces the time required for the catalyst to reach its optimum operating temperature after engine start-up or any other periods when the temperature of the catalyst falls outside the optimum operating temperature range. ECM 40 provides excess air by controlling the air/fuel ratio. Preferably, the air/fuel ratio is controlled via injectors 28 to provide a lean mixture ($\lambda>1$) to engine 12, i.e. ECM 40 biases the air/fuel ratio so that $\lambda$ is about 1.02, for example. Of course, the air/fuel ratio may also be controlled by controlling the amount of air supplied to engine 12, if desired.

Preferably, ECM 40 biases the fuel toward lean as a function of the temperature of the catalyst in converter 34, as well as a function of the engine speed and load. The lean bias is preferably continuously variable over the operating temperature range of the catalyst to provide varying air/fuel ratios. For example, when converter 34 is cold, ECM 40 may control the fuel to achieve an air/fuel ratio much greater than one. As the temperature approaches the preferred operating temperature range, ECM 40 may continuously vary the quantity of fuel supplied to engine 12 to achieve an air/fuel ratio only slightly greater than one. When the temperature of converter 34 reaches a predetermined or adaptable operating temperature, the temperature bias is removed so that ECM 40 controls the fuel to achieve an air/fuel ratio of lambda equal one. At this point, ECM 40 utilizes first oxygen sensor 42 to operate in the closed loop lambda control mode independent of the temperature of converter 34.

Figure 2:
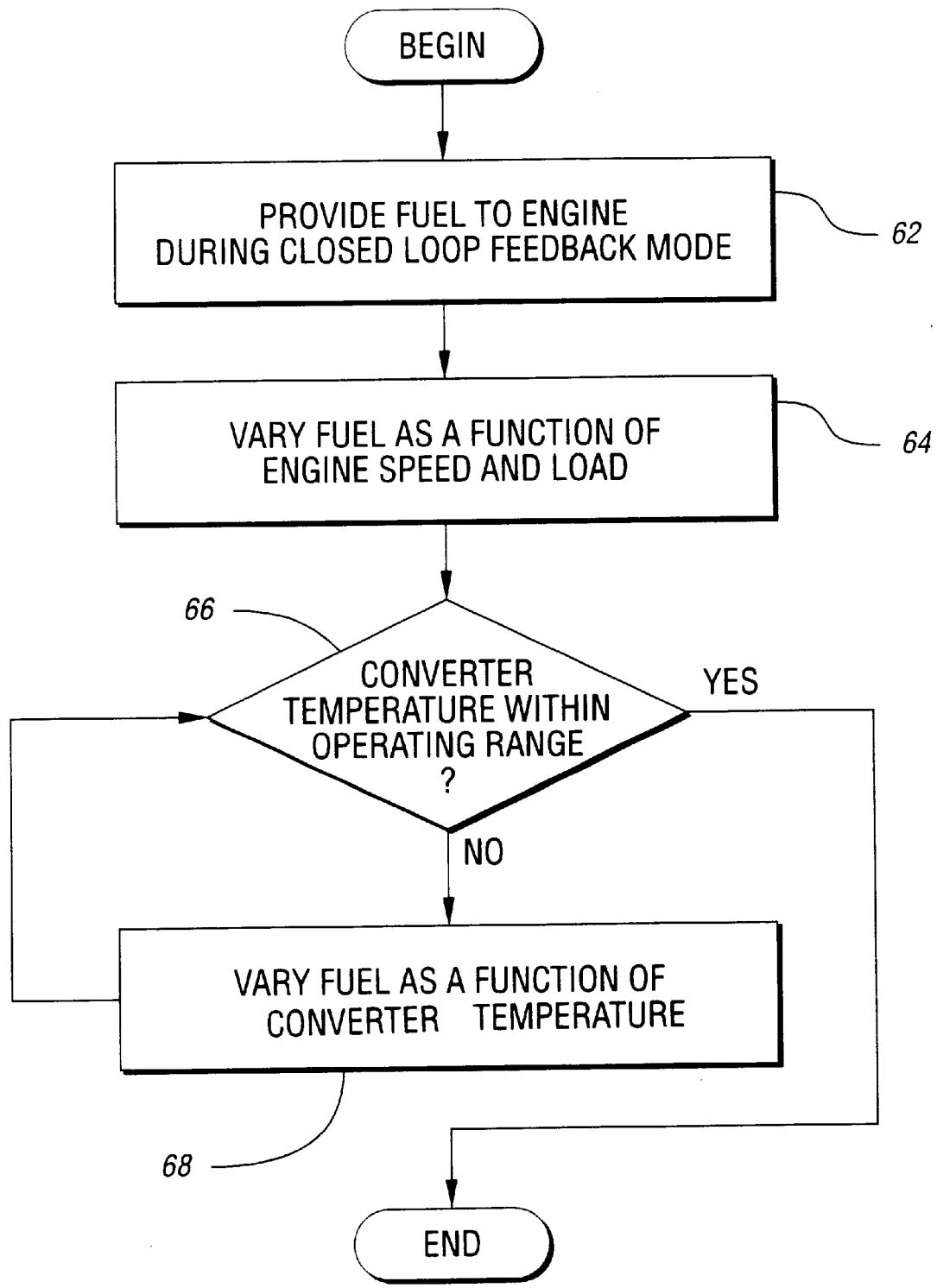
FIG. 2 is a flow diagram illustrating operation of a system or method according to the present invention.

Referring now to FIG. 2, a flow diagram generally illustrating operation of a system or method according to the present invention is shown. As will be appreciated by one of ordinary skill in the art, the flow diagram represents control logic which may be implemented in hardware, software, or a combination of hardware and software. Preferably, the control logic is stored in a computer readable medium, such as a PROM, EPROM, EEPROM, or flash memory, and represents program instructions which may be executed by a microprocessor. Of course, other implementations of the control logic using discrete components and/or custom integrated circuits, such as ASICs, are possible without departing from the spirit or scope of the present invention. One of ordinary skill in the art will also recognize that the particular order or sequence illustrated is not necessarily required to achieve the goals and objects of the present invention. FIG. 2 shows sequential operation of a system or method for ease of illustration and description only. As such, various processing strategies may be used, such as interrupt-driven processing, parallel processing, or the like depending upon the particular application.

Block 62 of FIG. 2 represents providing fuel to the engine during the closed loop lambda mode with lambda equal to unity. As described above, the closed loop lambda mode occurs when the HEGO sensor provides a signal indicative of oxygen content in the exhaust which is used by the ECM to control the air/fuel ratio of the mixture supplied to the engine. Traditionally, in closed loop lambda mode, the ECM continuously adjusts the fuel to achieve a stoichiometric air/fuel mixture (lambda equal unity). According to the present invention, an offset or bias may be applied so that the desired lambda exceeds unity when the catalyst is below a predetermined temperature to provide excess air to the catalyst.

Block 64 represents varying the quantity of fuel provided to the engine as a function of the engine speed and load to maintain the desired air/fuel ratio (indicated by lambda). Decision block 66 determines whether the temperature of the catalyst is within the desired operating temperature range. The temperature may be determined by an appropriate temperature sensor or may be inferred from various engine operating parameters and times as described above. If the temperature is within the operating range, then the desired lambda remains at unity and the ECM controls the fuel provided to the engine to maintain a stoichiometric ratio.

However, if the temperature of the converter is below the operating range, such as during an engine start-up interval or at any other time, then block 68 biases the desired lambda to exceed unity. The desired bias is continuously variable as a function of the current engine speed, engine load, and catalyst temperature. By varying the desired lambda when the engine is operating under closed loop control, the ECM continuously varies the amount of fuel provided to the engine to achieve a lean air/fuel mixture. This provides excess air to the engine to reduce the time necessary for the catalyst to reach the desired operating temperature range.

As the catalyst temperature changes and approaches the desired operating temperature range, block 68 adjusts the lambda bias or offset to gradually decrease the amount of excess air provided to the engine. When the catalyst temperature reaches the desired operating temperature as determined by block 66, the bias or offset is removed so that lambda returns to unity and the ECM controls the fuel to provide a stoichiometric air/fuel mixture to the engine.

Figure 3:
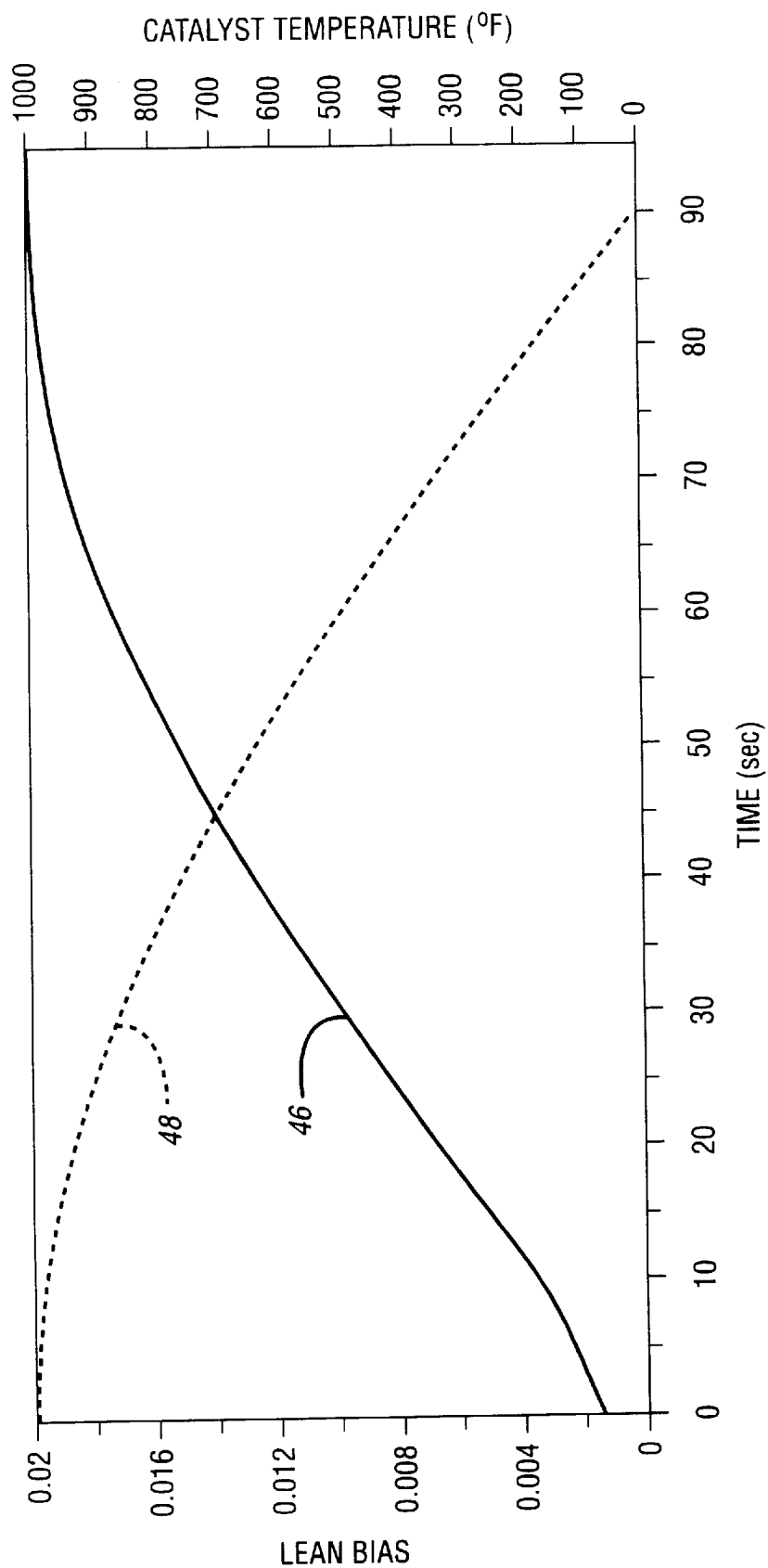
FIG. 3 illustrates variation of an air/fuel ratio in response to catalytic converter temperature according to one embodiment of the present invention.

Referring now to FIG. 3, a graphical representation of varying bias based on catalyst temperature according to the present invention is shown. The lean bias represents the bias or offset in the desired lambda value relative to a stoichiometric mixture where lambda equals unity. Solid line 46 represents catalyst temperature after a cold engine start. Broken line 48 represents the bias or offset relative to the current desired lambda value. As illustrated, the lean bias continually decreases with increasing catalyst temperature until the desired catalyst operating temperature is attained. Since the bias is applied during closed loop control, the ECM responds by reducing the pulse width supplied to the injectors. As a result, less fuel is injected and the air/fuel is biased toward lean.

FIG. 3 illustrates an example where an engine start-up interval lasting around 90 seconds is shown. In one embodiment, the bias offset is applied only for a predetermined time interval after a cold engine start. Preferably, closed loop control begins about ten seconds after the engine is started. Of course, the present invention may be utilized during any period that the catalyst operating temperature falls below a threshold temperature to reduce the time required to reach the optimum temperature for conversion of the exhaust gases.

Thus, the present invention reduces HC emissions by providing excess air to the catalyst when the catalyst is below a desired operating temperature. The excess air is provided at the engine rather than at the exhaust as done in the prior art ETA systems. As such, the present invention does not require additional hardware to achieve the benefits associated with operating the catalyst at its optimum temperature. The present invention provides a cost savings by eliminating the need for an ETA system while also reducing HC emissions.

While the best modes for carrying out the invention have been described in detail, those familiar with the art to which this invention relates will recognize various alternative designs and embodiments for practicing the invention as defined by the following claims.

What is claimed is:

1. A system for providing closed loop control of an air/fuel ratio for an internal combustion engine, the system comprising:

a catalytic converter in communication with the engine for converting exhaust gases generated by the engine during operation;

at least one fuel controller in communication with the engine for supply a quantity of fuel to the engine;

a sensor for providing a feedback signal indicative of the air fuel ratio; and an engine controller in communication with the at least one fuel controller and the sensor, the engine controller adding an offset which decreases as catalytic converter temperature increases to a desired air/fuel ratio to bias closed loop control of the air/fuel ratio to supply excess air to the catalytic converter so as to increase operating temperature of the catalytic converter.

2. The system of claim 1 further comprising a temperature sensor in communication with the engine controller, the temperature sensor being positioned to provide an indication of catalyst temperature within the catalytic converter.

3. The system of claim 1 wherein the sensor detects presence or absence of oxygen within the exhaust gases and generates a signal in response thereto.

4. The system of claim 1 wherein the offset decreases to zero a predetermined time period after the engine is started.

5. A method for controlling an internal combustion engine operatively associated with a catalyst for converting exhaust gases generated by the engine, the method comprising:

determining temperature of the catalyst;

modifying a desired air/fuel ratio by adding an offset to provide excess air to the catalyst based on the temperature of the catalyst wherein the offset decreases as the catalyst temperature increases;

generating a feedback signal indicative of an actual air/fuel ratio; and controlling the actual air/fuel ratio based on the feedback signal such that the actual air/fuel ratio approaches the desired air/fuel ratio.

6. The method of claim 5 wherein the step of modifying comprises modifying the desired air/fuel ratio for a predetermined period following an engine start.

7. The method of claim 5 wherein the step of controlling comprises controlling a quantity of fuel supplied to the engine.

8. The method of claim 5 wherein the step of determining comprises sensing the catalyst temperature.

9. A method for controlling an internal combustion engine operatively associated with a catalyst for converting exhaust gases generated by the engine, the method comprising:

determining temperature of the catalyst;

modifying a desired air/fuel ratio by adding a positive offset to provide excess air to the catalyst based on the temperature of the catalyst wherein the offset decreases as the catalyst temperature increases;

generating a feedback signal indicative of an actual air/fuel ratio; and controlling the actual air/fuel ratio based on the feedback signal such that the actual air/fuel ratio approaches the desired air/fuel ratio, wherein the desired and actual air/fuel ratios are represented by desired and actual variables corresponding to excursion from a stoichiometric air/fuel ratio.

10. The method of claim 9 wherein the step of modifying comprises adding an offset of zero after the catalyst temperature exceeds a predetermined threshold.

11. A computer readable storage medium for use with an internal combustion engine operatively associated with a catalyst which converts exhaust gases generated by the engine, the storage medium comprising:

control logic for determining temperature of the catalyst, modifying a desired closed loop air/fuel ratio by adding an offset which decreases as the temperature of the catalyst increases to provide excess air to the catalyst for a period of time after an engine start, generating a feedback signal indicative of an actual air/fuel ratio, and controlling the actual air/fuel ratio based on the feedback signal such that the actual air/fuel ratio approaches the desired closed loop air/fuel ratio so as to increase the temperature of the catalyst.

12. A method for controlling an engine operating in closed loop lambda mode to increase temperature of a catalyst to improve conversion efficiency of the catalyst, the method comprising:

determining a value representative of catalyst temperature;

when the value is below a first threshold, biasing a target air/fuel ratio toward lean by adding an offset value which decreases as catalyst temperature increases to the target air/fuel ratio to provide excess air to the catalyst to increase temperature of the catalyst and improve conversion efficiency.

13. The method of claim 12 further comprising:

decreasing fuel delivered to the engine while maintaining a current airflow so that actual air/fuel ratio approaches the target air/fuel ratio as adjusted by biasing.

* * * * *